(12) United States Patent
Sakamoto et al.

(10) Patent No.: US 7,141,168 B2
(45) Date of Patent: Nov. 28, 2006

(54) POROUS POLYOLEFIN MEMBRANE

(75) Inventors: Hideshi Sakamoto, Ichihara (JP);
Junichi Yamauchi, Ichihara (JP);
Takashi Shimpuku, Ichihara (JP)

(73) Assignees: Chisso Corporation, Osaka (JP);
Chisso Petrochemical Corporation, Tokyo (JP)

( * ) Notice: Subject to any disclaimer, the term of this patent is extended or adjusted under 35 U.S.C. 154(b) by 391 days.

(21) Appl. No.: 10/692,470

(22) Filed: Oct. 22, 2003

(65) Prior Publication Data
US 2005/0087487 A1    Apr. 28, 2005

(51) Int. Cl.
*B01D 39/00* (2006.01)
*B01D 15/00* (2006.01)

(52) U.S. Cl. ............ 210/500.36; 210/500.27; 428/315.5

(58) Field of Classification Search ........ 210/500.27, 210/500.36, 500.23; 264/53, 204, 288.8, 264/289.3, 290.2; 428/315.5; 521/64, 143; 95/45, 50; 96/4
See application file for complete search history.

(56) References Cited

U.S. PATENT DOCUMENTS

| | | | | |
|---|---|---|---|---|
| 4,734,196 A * | 3/1988 | Kono et al. | .......... | 210/500.36 |
| 4,743,375 A * | 5/1988 | Seita et al. | .......... | 210/500.36 |
| 4,909,971 A * | 3/1990 | Coughlin et al. | .......... | 264/45.5 |
| 4,927,576 A * | 5/1990 | Seita et al. | .......... | 264/49 |
| 5,071,554 A * | 12/1991 | Seita et al. | .......... | 210/486 |
| 5,139,529 A * | 8/1992 | Seita et al. | .......... | 29/469.5 |
| 5,176,953 A | 1/1993 | Jacoby et al. | .......... | 428/315.5 |
| 5,186,835 A * | 2/1993 | Masuoka et al. | .......... | 210/500.36 |
| 5,354,470 A * | 10/1994 | Seita et al. | .......... | 210/500.23 |
| 5,882,518 A * | 3/1999 | Yagi et al. | .......... | 210/500.36 |
| 5,968,994 A * | 10/1999 | Hashimoto et al. | .......... | 521/143 |
| 6,096,213 A * | 8/2000 | Radovanovic et al. | . | 210/500.36 |
| 6,127,438 A * | 10/2000 | Hasegawa et al. | .......... | 521/64 |
| 6,300,415 B1 | 10/2001 | Okayama et al. | .......... | 525/191 |
| 6,569,225 B1 * | 5/2003 | Edmundson et al. | .......... | 95/52 |
| 6,666,969 B1 * | 12/2003 | Funaoka et al. | .......... | 210/500.36 |
| 6,824,865 B1 * | 11/2004 | Funaoka et al. | .......... | 428/315.5 |

FOREIGN PATENT DOCUMENTS

| | | |
|---|---|---|
| JP | 8027238 | 1/1996 |
| JP | 8208862 | 8/1996 |

* cited by examiner

*Primary Examiner*—Ana Fortuna
(74) *Attorney, Agent, or Firm*—J.C. Patents

(57) ABSTRACT

The purpose of the invention is to provide a porous polyolefin membrane consistent with a simple composition that may be characterized by a small pore diameter and a high porosity by simplifying the manufacturing process to facilitate uniform dispersion of the components. Means to achieve the purpose—A porous polyolefin membrane is formed by melting and kneading a specific resin (C) which composition containing a polyolefin resin consisting of a crystalline polypropylene (A) and a propylene-α-olefin copolymer (B), dispersed in said crystalline polypropylene (A), to obtain a film-shaped melt, and forming a membrane from the said melt with specific conditions, followed by stretching of said membrane at least in one direction, which contains continuous pores in the region consisting of said copolymer (B).

16 Claims, 1 Drawing Sheet

POROUS POLYOLEFIN MEMBRANE

BACKGROUND OF THE INVENTION

1. Field of the Invention

The present invention relates to porous polyolefin membranes. More specifically, it relates to porous polyolefin membranes useful for applications including separation membranes or separators for galvanic cells.

2. Description of the Related Art

Porous plastic membranes have been used in a number of applications including separation membranes for filtration in medicine and industry, separators in galvanic cells and electrolytic capacitors, linings for paper diapers and other hygiene products, and building materials such as construction film and roofing base materials. In particular, porous polyolefin membranes are useful in applications in which the membranes come into contact with organic solvents or alkali or acidic solutions owing to their resistance to these substances.

Known manufacturing processes for porous polyolefin membranes include the following:

(a) Wherein a film consisting of a polyolefin combined with an inorganic filler, such as silica or talc, or an organic filler, such as nylon or polyethylene terephthalate, which are insoluble in the polyolefin, is stretched at least in one direction to form pores at the interfaces between the matrix polymer and filler ("multicomponent stretching" hereinafter).

(b) Wherein a crystalline polypropylene film manufactured at a high draft ratio, subsequently heat-treated as necessary, is stretched at least in one direction to form fibrils between lamellar crystallites, yielding a porous film ("single-component stretching" hereinafter).

(c) Wherein a film obtained by the formation of a mixture of a polyolefin resin with an organic liquid or an inorganic filler undergoes extraction of said organic liquid or inorganic filler, with stretching before or after said extraction, as necessary ("mixture extraction" hereinafter).

The multi-component stretching process, (a) above, may involve the addition of an inorganic filler or organic filler. A substantial quantity of inorganic filler is required, which may impair the properties, pliability, and acid/alkali resistance of the matrix polyolefin. An organic filler not only impairs the properties and pliability of the polyolefin but also presents difficulties in ensuring a fine dispersion in the matrix polymer, thus making it difficult to obtain films with a fine pore diameter or a high porosity.

The single-component extraction process, (b) above, involves film formation at a high draft ratio, prolonged heat treatment in a separate step, and multistage stretching under specific conditions. The sophistication inherent in the process necessitates a long manufacturing interval and suffers from low productivity. Additional problems include difficulty in obtaining films with a high porosity, which is intrinsic to the technique of fibril formation between lamellar crystallites, and low tear resistance of the membrane obtained as a result of stretching a highly oriented crystalline sheet.

The mixture extraction process, (c) above, represents a comparatively complicated method involving an extraction step wherein said organic liquid in the sheet is extracted with an organic solvent, or said inorganic filler with an alkaline solvent, followed by a washing and drying step. The organic liquid, if used, accounts for 40–60% by weight of the sheet, which retards the film forming process and renders stretching difficult. Moreover, the organic liquid tends to coat the rollers and other machine parts of the manufacturing process leading to reduced productivity.

Meanwhile, a porous membrane involving a simple manufacturing process thereof has been disclosed, wherein said membrane comprises of a component A consisting of an ethylene-propylene block copolymer, a component B consisting of a homopolymer or a random copolymer of propylene, and a component C consisting of a low molecular weight polypropylene, with the addition as necessary of a component D consisting of calcium carbonate or a component E consisting of a nucleation agent for beta spherulites (see e.g. Reference 1). In addition, a porous film has been disclosed consisting of a crystalline polyolefin resin composed of an ethylene-propylene block copolymer solely or, as necessary, in combination with polypropylene or polyethylene, to which a mineral oil or an ester compound with a boiling point up to 100° C. has been incorporated (see e.g. Reference 2).

These methods intend to improve the poor porosity and air permeability of pure ethylene-propylene block copolymer films by using additional components. However, a multicomponent system requires uniform distribution of those components to generate a uniform porous film. Furthermore, the pores thus formed in the membrane tend to consist of large diameters, which lead to difficulties in obtaining thin membranes, or membranes with a high porosity or high air/moisture permeability. Therefore, porous membranes manufactured according to these methods are not suitable for use as battery separators which require fine pores, or precision filters which require high porosity and air permeability.

Reference 1:
U.S. Pat. No. 5,176,953

Reference 2:
JP 8-208862 A (1996)

Problems Addressed by the Invention

The purpose of the present invention is, therefore, to solve the problems mentioned above in relation to conventional porous polyolefin membranes. More specifically, its purpose is to provide a porous polyolefin membrane having a simple resin composition, which facilitates uniform distribution of the components during the manufacturing process, resulting in the yield of fine pores and a high porosity.

Means to Solution of the Problems

The inventors have found that the problems mentioned above can be solved by the manufacture of a porous polyolefin membrane formed by melting and kneading a specific resin (C) which composition containing a polyolefin resin consisting of a crystalline polypropylene (A) and a propylene-α-olefin copolymer (B), dispersed in said crystalline polypropylene (A), to obtain a film-shaped melt, and forming a membrane from said melt in specific conditions, followed by stretching of the said membrane at least in one direction, which contains continuous pores in the region consisting of said copolymer (B). The present invention is based on this finding. "Continuous pores", as mentioned in this specification, describes pores formed in a continuous manner in the copolymer (B) region, which eventually connects the two surfaces of the porous membrane.

SUMMARY OF THE INVENTION

The present invention comprises the following:
1. A porous polyolefin membrane formed by melting and kneading a resin composition containing a polyolefin resin (C) consisting of 30–90 wt % crystalline polypropylene (A) and 10–70 wt % propylene-α-olefin copolymer (B), dispersed in said crystalline polypropylene (A), wherein the ratio of a melt flow rate of said crystalline polypropylene (A) $MFR_{PP}$ to that of said propylene-α-olefin copolymer (B) $MFR_{RC}$ is between 0.1 and 10, to obtain a film-shaped melt, and forming a membrane from said melt, followed by stretching said membrane at least in one direction, which contains continuous pores in the region consisting of said copolymer (B).
2. A porous polyolefin membrane according to 1 above, wherein a draft ratio range at forming said membrane from said melt is from 1 to 10.
3. A porous polyolefin membrane according to 1 above, wherein a draft ratio range at forming said membrane from said melt is from 1 to 3.
4. A porous polyolefin membrane according to any of 1 to 3 above, wherein the melt flow rate ratio $MFR_{PP}/MFR_{RC}$ is between 0.2 and 5.
5. A porous polyolefin membrane according to any of 1 to 4 above, wherein said resin composition contains a polyolefin resin (C) consisting of 40–70 wt % crystalline polypropylene (A) and 30–60 wt % propylene-α-olefin copolymer (B).
6. A porous polyolefin membrane according to any of 1 to 5 above, wherein said propylene-α-olefin copolymer (B) contains 30–80 wt % of propylene.
7. A porous polyolefin membrane according to any of 1 to 5 above, wherein said propylene-α-olefin copolymer (B) contains 40–70 wt % of propylene.
8. A porous polyolefin membrane according to any of 1 to 6 above, wherein said polyolefin resin (C) is obtained by a multistage polymerization process containing a first step to produce said crystalline polypropylene (A) and an immediately ensuing second step to produce said propylene-α-olefin copolymer (B).
9. A porous polyolefin membrane according to any of 1 to 8 above, wherein the air resistance (Gurley) is between 1 and 2,000 sec/100 mL and the moisture permeability is between 1,000 and 20,000 $g/m^2 \cdot 24$ h.
10. A porous polyolefin membrane according to any of 1 to 9 above, wherein a temperature at the membrane-break ($T_b$) is equal to or higher than 150° C. and a difference between the membrane-break temperature ($T_b$) and a pore-shutdown temperature ($T_b$) is equal to or less than 20° C.
11. A porous polyolefin membrane formed by melting and kneading a resin composition substantially containing only a polyolefin resin (C) consisting of 30–70 wt % crystalline polypropylene (A) and 30–70 wt % propylene-α-olefin copolymer (B), dispersed in said crystalline polypropylene (A), wherein the ratio of the melt flow rate of said crystalline polypropylene (A) $MFR_{PP}$ to that of said propylene-α-olefin copolymer (B) $MFR_{RC}$ is higher than 10 and equal to or less than 1,000, to obtain a film-shaped melt, and forming a membrane from said melt, followed by stretching said membrane at least in one direction, which contains continuous pores in the region consisting of said copolymer (B).
12. A porous polyolefin membrane according to 11 above, wherein the draft ratio range at forming a membrane from said melt is from 1 to 10.
13. A porous polyolefin membrane according to 11 or 12 above, wherein the draft ratio is between 1 and 5.
14. A porous polyolefin membrane according to any of 11 to 13 above, wherein said propylene-α-olefin copolymer (B) contains 30–80 wt % of propylene.
15. A porous polyolefin membrane according to any of 11 to 14 above, wherein said propylene-α-olefin copolymer (B) contains 40–70 wt % of propylene.
16. A porous polyolefin membrane according to any of 11 to 15 above, wherein said polyolefin resin (C) is obtained by a multistage polymerization process containing a first step to produce said crystalline polypropylene (A) and an immediately ensuing second step to produce said propylene-α-olefin copolymer (B).
17. A porous polyolefin membrane according to any of 11 to 16 above, wherein the air resistance (Gurley) is between 10 and 20,000 sec/100 mL and the moisture permeability is between 200 and 10,000 $g/m^2 \cdot 24$ h.

Advantage of the Invention

The porous polyolefin membrane according to the invention is obtained by finely dispersing propylene-α-olefin copolymer (B) in crystalline polypropylene (A) by a special processing technique, which improves the stretching performance at low temperatures and leads to the formation of pores in the region of copolymer (B) via breakage. The resultant film exhibits excellent characteristics including porosity and air permeability. The porous polyolefin membrane according to the invention is also economically favorable due to the simplified manufacturing process compared with conventional techniques. The membrane can be suitably employed in such applications as separation membranes, separators in galvanic cells, or permeable waterproof, which require membranes containing continuous fine pores.

DESCRIPTION OF THE PREFERRED EMBODIMENTS

Preferred embodiments of the invention are described below.

(1) Polyolefin Resins

The porous polyolefin membrane according to the invention is based on a polyolefin resin (C) consisting of a crystalline polypropylene (A) and a propylene-α-olefin copolymer (B), wherein the copolymer (B) exists as finely dispersed domains in the crystalline polypropylene (A) matrix.

(i) Crystalline Polypropylene (A)

The crystalline polypropylene (A) predominantly consists of propylene units which preferably account for 90 wt %. Specifically, it may be a propylene homopolymer or a random or block copolymer consisting of 90% or more of propylene and 10% or less of an α-olefin. Examples of the α-olefin employed in the crystalline polypropylene (A) include ethylene, 1-butene, 1-pentene, 1-hexene, 1-octene, 1-decene, 1-dodecene, 4-methyl-1-pentene, and 3-methyl-1-pentene. In view of production costs, propylene homopolymer or propylene-ethylene-copolymer containing 90 wt % or more propylene units is preferable.

The melt flow rate of the crystalline polypropylene (A), $MFR_{PP}$, should preferably be between 0.1 and 50 g/10 min to assure stable film formation.

(ii) Propylene-α-Olefin Copolymer (B)

The propylene-α-olefin copolymer (B) is a random copolymer of propylene and another α-olefin. It should desirably contain 30–80 wt %, or more desirably 35–75 wt %, or further desirably 40–70 wt %, of propylene. These ranges of propylene content should ensure easy formation of pores in the copolymer (B) domain in the crystalline polypropylene (A) matrix, and inhibit peeling of the crystalline polypropylene (A) and copolymer (B) regions, which results in favorable stretching characteristics at low temperatures, allowing manufacturing of a porous membrane with a small pore diameter.

Said α-olefin other than propylene in the copolymer (B) may be ethylene, 1-butene, 1-pentene, 1-hexene, 1-octene, 1-decene, 1-dodecene, 4-methyl-1-pentene, or 3-methyl-1-pentene, among which ethylene is preferred in view of production costs.

No restriction is imposed on the melt flow rate, $MFR_{RC}$, of the propylene-α-olefin copolymer (B); however, a range of 0.1–20 g/10 min is preferable in view of processing characteristics.

(iii) Polyolefin Resin (C)

The polyolefin resin (C) consists of the crystalline polypropylene (A) and propylene-α-olefin copolymer (B). The ratio of the melt flow rate of the crystalline polypropylene (A), $MFR_{pp}$, to that of the propylene-α-olefin copolymer (B), $MFR_{RC}$ ("MFR ratio" hereinafter), is preferred, though not restricted, to be in a range of 0.1–1,000 in view of processing characteristics.

In particular, MFR ratios between 0.1 and 10, especially between 0.2 and 5, facilitate formation of fine continuous pores because of fine dispersion of the copolymer (B) in the crystalline polypropylene (A). This leads to a greater number of contacts between the fine pores, tending to yield a porous membrane with a low air resistance (Gurley), as defined in JIS P 8117, and a high air permeability. This also leads to a high porosity due to favorable stretching characteristics, further improving air permeability.

An MFR ratio higher than 10 and lower than 1,000 will result in a larger pore size than that between 0.1 and 10, leading to a lower share of continuous pores, but also to a porous membrane with stable characteristics which are less dependent on film forming and stretching conditions.

According to the present invention, MFR ratios between 0.1 and 10 result in porous membranes with a air resistance (Gurley) between 1 and 1,000 sec/100 mL and a moisture permeability between 1,000 and 20,000 g/m²·24 h. Scanning electron microscopy (SEM) of such porous membranes reveals a continuum of interconnected fine pores 1–2 µm in diameter with a maximum length of the longer axis less than 5 µm. Porous membranes containing such a pore configuration are favorably used as separation membranes or battery separators for such as primary lithium batteries, secondary lithium batteries.

In case of secondary lithium battery separators, a shutdown of electric current should be necessary at high temperature without membrane break (shutdown capability) in order to prevent an accident, such as catching fire caused by abnormal elevation of battery temperature. It is desirable that the difference $\Delta T$ between the membrane-break temperature ($T_b$) and the pore-shutdown temperature ($T_s$) is larger, and pore-shutdown temperature ($T_s$) is lower.

According to the present invention, MFR ratios between 0.1 and 10 result in porous membranes with a good shutdown capability. The difference $\Delta T$ between $T_b$ and $T_s$ is equal to or less than 20° C. so that said porous membranes are preferably used as battery separators. Good shutdown capability of the porous membranes may be owing to the many pores with micro size, existing in the region of the copolymer (B) not in the boundary region between the crystalline polypropylene (A) and the copolymer (B). The crystalline polypropylene (A) matrix miscible with the copolymer (B) may restrict the thermal shrinkage of copolymer (B) region because of the hard entanglement of the crystalline polypropylene (A) and the copolymer (B).

Contrary, MFR ratios between 10 and 1,000 result in porous membranes with a air resistance (Gurley) between 10 and 20,000 sec/100 mL and a moisture permeability between 200 and 10,000 g/m²·24 h. Scanning electron microscopy (SEM) of such porous membranes reveals a continuum of interconnected fine pores about 5 µm in diameter with a maximum length of the longer axis less than 10 µm. Porous membranes containing such a pore configuration are stable in quality even under varying production conditions and are relatively inexpensive. They are suitable for construction materials, such as air-permeable waterproofing, or hygiene products such as permeable linings for disposable diapers.

The content of the crystalline polypropylene (A) in the polyolefin resin (C) should be 30–90 wt %, or preferably 40–70 wt %; that of the propylene-α-olefin copolymer (B) 10–70 wt %, or preferably 30–60 wt %. A copolymer (B) content less than 10 wt % reduces continuity of the pores formed in the copolymer (B) region, thus reducing the number of continuous pores essential in the invention, whereas a content over 70 wt % inhibits formation of the finely dispersed structure of the copolymer (B) regions in the crystalline polypropylene (A) matrix. For MFR ratios greater than 10 and up to 1,000, the content of crystalline polypropylene (A) in the polyolefin resin (C) should be 30–70 wt %, or preferably 40–60 wt %; that of propylene-α-olefin copolymer (B) 70–30 wt %, or preferably 60–40 wt %. These content ranges of the crystalline polypropylene (A) and copolymer (B) result in continuous pores and satisfactory dispersion of copolymer (B).

No particular restriction is imposed on the manufacturing processes of said polyolefin resin (C); any the process may be used as long as conditions described above are met. An example is mixing of separately prepared crystalline polypropylene (A) and propylene-α-olefin copolymer (B) by melt kneading. The latter may be, for instance, a propylene-α-olefin copolymer prepared in a process involving the titanium-based Ziegler-Natta catalyst, or commercially available ethylene-propylene rubber.

The polyolefin resin (C) may also be manufactured by polymerizing the crystalline polypropylene (A) and copolymer (B) in a multi-stage, continuous process. As an example, a plurality of reactors are employed to produce the crystalline polypropylene (A) in the first stage, and to produce the copolymer (B) in the presence of said crystalline polypropylene (A) in the second, eventually to form the polyolefin resin (C) in a continuous manner. This process is preferable to the melt mixing technique described above because of lower production costs and more uniform distribution of the copolymer (B) in the crystalline polypropylene (A) matrix.

A particularly preferable polyolefin resin (C) according to the invention is manufactured by the continuous polymerization process described above, and tailored to have an MFR ratio of 10 or lower, or preferably between 0.2 and 5. This range of the MFR ratio allows uniform and fine dispersion of the copolymer (B) in the crystalline polypropylene (A) matrix, resulting in uniform formation of fine pores, upon stretching the polyolefin resin (C), in the copolymer (B) region dispersed in the crystalline polypropylene (A). A porous membrane with fine pores and high porosity is thus obtained.

The porous polyolefin membrane according to the invention shows a number of small fissures in the copolymer (B) region finely dispersed in crystalline polypropylene (A). These fissures are presumably formed by stretching stress applied in the copolymer (B) region that has a lower strength than the crystalline polypropylene (A) while being miscible with the same because the two components share propylene units. This pore formation mechanism is essentially different from that in conventional products obtained by addition of inorganic fillers or different polymers and subsequent stretching, and leads to smaller pore sizes and high porosities and air permeabilities.

Incidentally, the copolymer (B) region in the present specification comprises the region occupied by the copolymer (B) itself as well as the boundary region between the copolymer (B) and the adjacent phase. Therefore, pores in the copolymer (B) region are formed either in the region of the copolymer (B) by fissure or in said boundary region by peeling at the interface.

The polyolefin resins (C) having the range of the MFR ratio mentioned above may be manufactured by the method described in U.S. Pat. No. 6,300,415 or JP 8-27238 A (1996). In addition, a commercial product with appropriate specifications may also be used as the polyolefin resin (C) of the invention.

The MFR ratio defined earlier may normally be determined by measuring the $MFR_{PP}$ of the crystalline polypropylene (A) and the $MFR_{RC}$ of the propylene-α-olefin copolymer (B). However, $MFR_{RC}$ cannot be directly measured in the continuous multistage polymerization process described above (wherein the crystalline polypropylene (A) is first manufactured followed by formation of the copolymer (B)). In this case $MFR_{RC}$ is calculated from the observable $MFR_{PP}$ of the crystalline polypropylene (A), the melt flow rate of the polyolefin resin (C) obtained, $MFR_{WHOLE}$, and the copolymer (B) content in the resin (C), $W_{RC}$, by the following formula:

$$\log(MFR_{RC}) = \{\log(MFR_{WHOLE}) - (1 - W_{RC}/100)\log(MFR_{PP})\}/(W_{RC}/100)$$

(2) Resin Composition for Formation of Porous Polyolefin Membrane

The resin composition for formation of a film-shaped body, from which the porous polyolefin membrane is manufactured according to the invention, may contain, in addition to the polyolefin resin (C), antioxidants, neutralizing agents, nucleating agents for α or β crystals, hindered amine weathering stabilizers, UV absorbers, surfactants as antifogging or antistatic additives, inorganic fillers, lubricants, antiblocking agents, antibacterial or antifungal agents, or pigments, as normally used in common polyolefins, if necessary.

Examples of the antioxidants include phenolic antioxidants, such as tetrakis[methylene-3-(3',5'-di-t-butyl-4'-hydroxyphenyl)propionate]methane, 2,6-di-t-butyl-4'-methylphenol, n-octadecyl-3-(3',5'-di-t-butyl-4'-hydroxyphenyl) propionate, or tris(3,5-di-t-butyl-4'-hydroxybenzyl) isocyanurate, or phosphorous antioxidants, such as tris(2,4-di-t-butylphenyl)phosphite, tris(nonylphenyl)phosphite, distearylpentaerythritol diphosphite, tetrakis(2,4-di-t-butylphenyl)-4,4'-biphenylene diphosphonite.

The neutralizing agents consist of, for example, higher fatty acid salts such as calcium stearate. The inorganic fillers and antiblocking agents may consist of, for example, calcium carbonate, silica, hydrotalcite, zeolite, aluminum silicate or magnesium silicate. The lubricants may consist of, for example, higher fatty acid amides such as stearic amide. The antistatic agents may consist of, for example, fatty acid esters such as glycerin monostearate.

Known examples of the nucleating agents for α crystals include talc, aluminum hydroxy-bis(4-t-butyl benzoate), 1.3, 2.4-dibenzylidenesorbitol, 1.3,2.4-bis(p-methylbenzylidene)sorbitol, 1.3,2.4-bis(p-ethylbenzylidene)sorbitol, 1.3,2.4-bis(2',4'-dimethylbenzylidene)sorbitol, 1.3,2.4-bis(3',4'-dimethylbenzylidene)sorbitol, 1.3-p-chlorobenzylidene-2•4-p-methylbenzylidenesorbitol, 1.3,2.4-bis(p-chlorobenzylidene)sorbitol, sodium bis(4-t-butylphenyl) phosphate, sodium 2,2'-methylene-bis(4,6-di-t-butylphenyl) phosphate, calcium 2,2'-methylene-bis(4,6-di-t-butylphenyl)phosphate, and aluminum dihydroxy-2,2'-methylene-bis(4,6-di-t-butylphenyl)phosphate. Any of these substances may be used singly or in combination with each other.

The amount employed of these additives should preferably be 0.001–5 wt % of the total resin composition, depending on the intended application of the membrane.

Said resin composition for the porous polyolefin membrane according to the invention may contain one or more other polyolefin resins, such as propylene homopolymer, random copolymers of propylene, polyethylene, polybutene or polymethylpentene.

Furthermore, said resin composition may contain elastic copolymers, such as elastic ethylene-diene, ethylene-propylene or styrene-butadiene copolymer manufactured using a single site catalyst or known multisite catalyst, to lower the softening point or improve flexibility.

No restriction is imposed on the method of mixing said additives with the polyolefin resin (C). For example, a common mixing apparatus may be used, such as a mixer with a high-speed agitator such as an Henschel mixer, or a general mixer such as a ribbon blender or tumbler mixer (dry blending), before pelletizing using a common uniaxial or biaxial extruder.

(3) Formation of the Porous Polyolefin Membrane

The porous polyolefin membrane according to the invention is manufactured by melting and kneading said resin composition, chiefly consisting of the polyolefin resin (C), forming a film out of the melt with a draft ratio between 1 and 10, and stretching the film in at least one direction at a temperature below 100° C. The process comprises a film forming step and a stretching step.

(i) Film Forming Step

The film forming step whereby said resin composition is processed into a film may be by the known inflation technique, T-die technique or calendering process, among which the T-die technique is preferable for increased precision in film thickness and ease of lamination.

Said resin composition may be formed into a film at temperatures over 180° C. However, it is desirable to extrude the resin at 220–300° C. to lower the draft ratio, as explained later, by reducing pressure in the die, and to facilitate formation of uniform fine pores in the propylene-α-olefin copolymer (B) region dispersed in the crystalline polypropylene (A) matrix by enhancing the rigidity of the latter.

The melted and kneaded resin composition is extruded through the die lips. The draft ratio $V_{CL}/V_f$, where $V_{CL}$ is the linear velocity of the composition in the flow direction (MD) and $V_f$ the linear velocity of the film in the MD direction, is an essential parameter to achieving the purpose of the present invention. Although the draft ratio in film formation of thermoplastic resins ranges generally from 10 to 50, a range of between 1 to 10 in the present invention leads to improved stretching characteristics and easier formation of fine continuous pores on stretching.

For MFR ratios between 0.1 and 10, the draft ratio should desirably be 1–5, or more desirably 1–3. For MFR ratios greater than 10 and up to 1,000, the draft ratio should desirably be 1–5.

The process described above allows formation of continuous pores even in the polyolefin (C) resins with MFR ratios greater than 10 and up to 1,000 in which such pores are not always easily formed. The process also yields porous membranes with sufficient air permeability suitable for hygiene and building materials even with a polyolefin resin (C) consisting solely of crystalline polypropylene (A) and propylene-α-olefin copolymer (B).

To improve the rigidity of crystalline polypropylene (A) and formation of fine continuous pores, it is desirable to cool the film extruded from the die lip slowly, with a cooling roller temperature of 60–120° C., or preferably 70–110° C. This temperature range not only facilitates production of porous membranes as intended, but also alleviates adhesion of molten resin to the rollers.

Although not restricted specifically, the thickness of the film obtained in the film forming step should be determined according to the stretching and heat-treatment conditions in the following step, taking requirements of the finished porous membrane into account: a desirable range is 20 μm to 2 mm, or more desirably 50 to 500 μm. A desirable range of film forming rate is 1 to 100 m/min. Films with such thicknesses may be obtained in various film forming apparatuses, such as the inflation machine, calendering machine, or T-die film casting machine equipped with said cooling roller in combination with an air knife with an air nozzle, a metallic roller or a stainless steel belt.

The porous polyolefin membrane according to the invention may be obtained by coextruding the resin composition of the invention with another resin composition containing known inorganic or organic fillers, the latter preferably being polyolefins, such as polypropylene resin or polyethylene resin, in view of the miscibility with the resin composition of the invention.

Furthermore, the film obtained may be heat-treated before stretching to enhance crystallinity. A typical heat treatment is carried out by an oven with hot air circulation or by heating rollers for 1–30 min at a temperature of 80–150° C.

(ii) Stretching Step

As an essential step in the manufacturing process according to the invention, as distinct from the conventional single component or multicomponent stretching or mixture extraction processes, the film formed in the previous step is now stretched in the longitudinal (MD) direction and/or the transversal (TD) direction to form continuous pores in the propylene-α-olefin copolymer (B) region. This eliminates the complicated extraction and drying steps in the mixture extraction process, or the heat treatment of the film for crystallization in the single component stretching process wherein pores are generated by fibril formation in the interlamellar regions. It also solves problems in the multicomponent stretching process, wherein pores are formed along the interface between the polymer matrix and filler, such as poor stretching characteristics, excessive pore size or excessively low porosity. In summary, the stretching allows the manufacture of porous membranes at a high productivity with the desired pore sizes and porosities.

Any of the stretching processes, including uniaxial stretching, consecutive biaxial stretching wherein stretching is performed first in one direction and subsequently in the other, simultaneous biaxial stretching wherein the film is stretched in the two directions simultaneously, or consecutive or simultaneous biaxial stretching followed by additional stretching, is applicable in this step. Since the film has been drafted in the preceding film forming step, the ethylene-α-olefin copolymer (B) regions dispersed in the crystalline polypropylene (A) matrix are already oriented in the flow direction (MD direction) even at lower draft ratios, although it is desirable to stretch the film first in the transversal direction, or in the two directions simultaneously, a consecutive biaxial stretching consisting of the first longitudinal and the second transversal stretching is acceptable.

The temperature at which the first stretching is performed is desirably lower than the melting point $T_{m\alpha}$ of the propylene-α-olefin copolymer (B). A suitable temperature range is 10–100° C. The inventors have found that the stretching characteristics of the film at these low temperatures are improved by selecting a particular composition of the polyolefin resin (C). The stretching ratio, though not restricted specifically, should be determined according to the conditions of the second stretching, performed as necessary, and requirements for the use of the finished porous membrane: a desirable range is 1.5 to 7 for MFR ratios of 1 to 10, where stretching characteristics are more favorable than in higher MFR ratios; for MFR ratios greater than 10 and up to 1,000, the stretching ratio is usually between 1.5 and 4.

These stretching ratio ranges ensure excellent characteristics of the porous membranes obtained, and eliminate breakage during stretching that impair productivity. For simultaneous biaxial stretching, a desirable range of the area-stretching ratio (i.e. the product of the longitudinal and transversal stretching ratios) is 2–50, or more desirably 4–40. These area-stretching ratio ranges ensure excellent characteristics of the porous membranes obtained, and eliminate breakage during stretching that impair productivity.

The temperature at which the second stretching is performed as necessary should desirably be lower than the melting point of the crystalline polypropylene (A), $T_{mc}$, by 10° C. or greater. It is generally observed that a stretching temperature higher than the melting point of the propylene-α-olefin copolymer (B), $T_{m\alpha}$, leads to a film of a relatively low porosity and low thickness, while a temperature lower than $T_{m\alpha}$ increases the porosity but does not reduce the thickness significantly.

The ratio of the second stretching should be determined according to requirements for the use of the finished porous membrane: a desirable range is 1.5 to 7 for MFR ratios of 1 to 10, where stretching characteristics are more favorable than in higher MFR ratios; for MFR ratios greater than 10 and up to 1,000, the stretching ratio is usually between 1.5 and 4.

These stretching ratio ranges ensure effective stretching and eliminate breakage during stretching that impair productivity.

It is preferable that the film rendered porous in the stretching step described above is subsequently heat-treated, chiefly in order to fix the formed pores thermally. The heat treatment is usually performed on or between heating rolls, or by passing through an oven with hot air circulation.

The heat treatment (thermal fixation) is performed by heating the porous film to a temperature lower than the melting point of the crystalline polypropylene (A), $T_{mc}$, by 5–60° C., while maintaining the stretching tension, at a relaxation rate of 0–50%. A temperature higher than the upper limit may close some pores once formed, while a temperature lower than the lower limit may result in poor fixation, leading to pore closure later, or to heat shrinkage of the finished porous membrane while in application.

The thickness of the porous polyolefin membrane according to the invention, though not specifically restricted, should preferably be 10–200 μm in view of productivity.

The surface of the porous polyolefin membrane according to the invention may be rendered hydrophilic, as necessary, e.g. by treating with surfactants, corona discharge, low-temperature plasma, sulfonation or UV irradiation, or by grafting under radioactivity. Furthermore, a variety of coating films may be applied to the surface.

The porous polyolefin membrane obtained in the process described so far may be used in various applications, as conventional porous membranes, such as filters/separators for air and water cleaning, separators for galvanic cells and electrolytic cells, or moisture-permeable waterproofing for building materials and clothes.

EXAMPLE 1

The invention is further explained below by means of a series of examples and comparative examples, which do not limit the scope of the invention. Measurement and evaluation methods used are listed below.

(1) Porosity: Calculated from a bulk density determined for a 100×100 mm porous film sample, and a true density determined for a 100×100 mm film sample before stretching (nonporous) using a Toyo Seiki Densimeter D-S, by the formula:

Porosity (%)=(1−bulk density/true density)×100

(2) Maximum pore diameter: Regarded as equal to the maximum length of the pores in the longer axis direction as observed by scanning electron microscopy (SEM) of the cross sections in the longitudinal (MD) and transversal (TD) directions.

(3) Moisture permeability: Determined according to ASTM E 96.

(4) Melt flow rate (MFR): Determined according to JIS K 7210 at 230° C. under a load of 21.18 N.

(5) Air resistance (Gurley): Determined from the time required for 100 mL of air to flow through the sample according to JIS P8117 using a Gurley Densometer manufactured by Tester Sangyo.

(6) Pore-shutdown temperature ($T_s$) and Membrane-break temperature ($T_s$): Pore-shutdown temperature ($T_s$) was determined as an elevated temperature of thermal treatment at which the air resistance (Gurley) of the thermal-treated (1 hour) porous membrane sample is equal to 10,000 s/100 mL. A porous membrane sample was fixed and thermal-treated on a circular holder having 3 inches diameter in the hot oven, then the oven temperature was elevated at intervals of 5° C., from 120° C. to 170° C.

Membrane-break temperature ($T_s$) was determined as an elevated temperature at which the membrane was broken when thermal-treated as in the case of $T_s$. The difference $\Delta T$ between the membrane-break temperature ($T_b$) and the porous-shutdown temperature ($T_s$) were calculated by the formula:

$\Delta T = T_b - T_s$ (7) Stretching characteristic: Evaluated as the maximum relative elongation before fracture of a sample, 40×100 mm in size cut from the film with the longer side in either the longitudinal (MD) or transversal (TD) direction, at 23° C. at a uniaxial stretching rate of 200%/s. The test was performed incrementally with a step corresponding to 0.5 times sample length. The higher the value of this parameter, the easier a high porosity can be attained.

1) Preparation of Resin Composition for Manufacturing a Porous Membrane

In the first example, as summarized in Table 1, a polyolefin resin (C) was mixed with 0.1 wt % tetrakis[methylene-3-(3',5'-di-t-butyl-4'-hydroxyphenyl)propionate]methane (a phenolic antioxidant), 0.1 wt % tris(2,4-di-t-butylphenyl) phosphite (a phosphorous antioxidant) and 0.1 wt % calcium stearate (a neutralizing agent) in a Henschel mixer, before being melted, kneaded and pelletized in a biaxial extruder 50 mm in diameter to obtain a resin composition for forming a porous membrane. The polyolefin resin (C) was obtained by a continuous polymerization process, in which crystalline polypropylene (A) was prepared in the first stage and a propylene-α-olefin (propylene-ethylene) copolymer in the second.

2) Preparation of Porous Membrane—Forming a Film

The pelletized resin composition obtained above was charged into a 20-mm extruder equipped with a T-die with a lip width of 120 mm, melted at 280° C., extruded at a discharge rate of 4 kg/h through the lip die with a clearance adjusted to 0.20 mm, and passed over a cooling roller at 80° C. to form a film 100 mm wide and 200 μm thick. An air knife was used in the cooling step to cool the side not in contact with the cooling roller. The stretching characteristics evaluated for the film thus obtained are shown in Table 1.

3) Preparation of Porous Membrane—Stretching

The film obtained above was stretched in the transversal (TD) direction, under constraint in the longitudinal (MD) direction, at a temperature of 23° C., a deformation rate of 200%/s and a stretching ratio of 3, followed by stretching in the longitudinal (MD) direction at a temperature of 100° C., deformation rate of 1,000%/s and a stretching ratio of 3. The characteristics of the porous membrane obtained are shown in Table 1.

EXAMPLE 2

A porous polyolefin membrane was prepared as in Example 1, with the exception of the polyolefin resin (C) shown in Table 1 where Example 2 was used. The stretching characteristics of the film and the characteristics of the porous membrane obtained are summarized in Table 1.

EXAMPLE 3

A porous polyolefin membrane was prepared as in Example 1, with the exception of the polyolefin resin (C) shown in Table 1 where Example 3 was used. The stretching characteristics of the film and the characteristics of the porous membrane obtained are summarized in Table 1.

EXAMPLE 4

A porous polyolefin membrane was prepared as in Example 1, with the exception of the polyolefin resin (C) shown in Table 1 where Example 4 was used. The stretching characteristics of the film and the characteristics of the porous membrane obtained are summarized in Table 1.

EXAMPLE 5

A porous polyolefin membrane was prepared as in Example 1 using the polyolefin resin (C) shown in Table 1, Example 5. The transversal stretching ratio was 2.5 instead of 3, with breakage at the latter ratio occurring frequently. The stretching characteristics of the film and the characteristics of the porous membrane obtained are summarized in Table 1.

COMPARATIVE EXAMPLE 1

A porous polyolefin membrane was prepared as in Example 1 using the polyolefin resin (C) shown in Table 1, Comparative Example 1. The stretching characteristics of the film and the characteristics of the porous membrane obtained are summarized in Table 1.

COMPARATIVE EXAMPLE 2

A porous polyolefin membrane was prepared as in Example 1 using the polyolefin resin (C) shown in Table 1, Comparative Example 2. The film obtained had poor stretching characteristics such that breakage occurred at a transversal stretching ratio less than 1.5. A stretching ratio as low as 1.2 did not result in satisfactory characteristics of the membrane obtained.

COMPARATIVE EXAMPLE 3

A porous polyolefin membrane was prepared as in Example 1 except that 50 wt % of crystalline propylene homopolymer and 50 wt % of ethylene homopolymer were used instead of the polyolefin resin (C). The film obtained had poor stretching characteristics such that breakage occurred at a transversal stretching ratio less than 1.5. The characteristics of the porous membrane obtained are summarized in Table 1. A stretching ratio as low as 1.2 did not result in satisfactory characteristics of the membrane obtained.

EXAMPLE 6

5 A porous polyolefin membrane was prepared as in Example 4 except that the lip clearance of the T-die was adjusted to 0.6 mm. The stretching characteristics of the film and the characteristics of the porous membrane obtained are summarized in Table 2.

EXAMPLE 7

A porous polyolefin membrane was prepared as in Example 4 except that the lip clearance of the T-die was adjusted to 1.2 mm. The stretching characteristics of the film and the characteristics of the porous membrane obtained are summarized in Table 2.

COMPARATIVE EXAMPLE 4

A porous polyolefin membrane was prepared as in Example 4 except that the lip clearance of the T-die was adjusted to 2.0 mm. The stretching characteristics of the film and the characteristics of the porous membrane obtained are summarized in Table 2.

EXAMPLE 8

A porous polyolefin membrane was prepared as in Example 4 except that the stretching ratios were 5 in the transversal direction and 6 in the longitudinal direction. The stretching characteristics of the film and the characteristics of the porous membrane obtained are summarized in Table 2.

EXAMPLE 9

A porous polyolefin membrane was prepared as in Example 4 except that the transversal stretching temperature was 80° C. The stretching characteristics of the film and the characteristics of the porous membrane obtained are summarized in Table 2.

COMPARATIVE EXAMPLE 5

A porous polyolefin membrane was prepared as in Example 4 except that the transversal stretching temperature was 120° C. The stretching characteristics of the film and the characteristics of the porous membrane obtained are summarized in Table 2.

EXAMPLE 10

A porous polyolefin membrane was prepared as in Example 4 except that stretching was performed only transversally. The stretching characteristics of the film and the characteristics of the porous membrane obtained are summarized in Table 2.

EXAMPLE 11

A porous polyolefin membrane was prepared as in Example 1 except that for the polyolefin resin (C) shown in Table 3, Example 11 was used; that the T-die lip clearance was adjusted to 0.4 mm; and that the transversal stretching temperature was 80° C. The transversal stretching ratio was 2.5 instead of 3, at which ratio breakage occurred frequently. The stretching characteristics of the film and the characteristics of the porous membrane obtained are summarized in Table 3.

EXAMPLE 12

A porous polyolefin membrane was prepared as in Example 11 except that for the polyolefin resin (C) shown in Table 3, Example 12 was used. The stretching characteristics of the film and the characteristics of the porous membrane obtained are summarized in Table 3.

EXAMPLE 13

A porous polyolefin membrane was prepared as in Example 11 except that for the polyolefin resin (C) shown in Table 3, Example 13 was used. The stretching characteristics of the film and the characteristics of the porous membrane obtained are summarized in Table 3.

EXAMPLE 14

A porous polyolefin membrane was prepared as in Example 11 except that for the polyolefin resin (C) shown in Table 3, Example 14 was used. The stretching characteristics of the film and the characteristics of the porous membrane obtained are summarized in Table 3.

EXAMPLE 15

A porous polyolefin membrane was prepared as in Example 12 except that the T-die lip clearance was adjusted to 0.2 mm. The stretching characteristics of the film and the characteristics of the porous membrane obtained are summarized in Table 4.

EXAMPLE 16

A porous polyolefin membrane was prepared as in Example 12 except that the T-die lip clearance was adjusted to 1.2 mm. The stretching characteristics of the film and the characteristics of the porous membrane obtained are summarized in Table 4.

EXAMPLE 17

A porous polyolefin membrane was prepared as in Example 12 except that stretching was performed only transversally. The stretching characteristics of the film and the characteristics of the porous membrane obtained are summarized in Table 4.

EXAMPLE 18

A porous polyolefin membrane was prepared as in Example 12 except that the first stretching was performed longitudinally at 23° C. at a ratio of 3, and the second transversally at 80° C. at a ratio of 3. The stretching characteristics of the film and the characteristics of the porous membrane obtained are summarized in Table 4.

COMPARATIVE EXAMPLE 6

A porous polyolefin membrane was prepared as in Example 12 except that the T-die lip clearance was 2.0 mm. The stretching characteristics of the film and the characteristics of the porous membrane obtained are summarized in Table 4.

COMPARATIVE EXAMPLE 7

A porous polyolefin membrane was prepared as in Example 12 except that the cooling roller temperature was 30° C. The stretching characteristics of the film and the characteristics of the porous membrane obtained are summarized in Table 4.

EXAMPLE 19

Pore-shutdown temperature ($T_s$) and membrane-break temperature ($T_b$) of the porous polyolefin membrane obtained in Example 6 were evaluated. The $T_b$ was 170° C. and $T_s$ was 140° C. $\varDelta T$ calculated from $T_b$ and $T_s$ was 30° C. that said porous polyolefin membrane had a good shutdown capability.

EXAMPLE 20

Pore-shutdown temperature ($T_s$) and membrane-break temperature ($T_b$) of the porous polyolefin membrane obtained in Example 16 were evaluated. The $T_b$ was 170° C. and $T_s$ was 160° C. $\varDelta T$ calculated from $T_b$ and $T_s$ was 10° C. that said porous polyolefin membrane had a shutdown capability.

COMPARATIVE EXAMPLE 8

Pore-shutdown temperature ($T_s$) and membrane-break temperature ($T_b$) of the porous polypropylene battery separator (Celgard 2400 sold by Celgard K.K., thickness; 27 μm, porosity; 38%, Air resistance; 600 s/100 mL) were evaluated. The $T_b$ was 165° C. and $T_s$ was not determined because the air resistance (Gurley) of the separator thermally treated at 160° C. was 710 s/100 mL, neither equal to nor higher than 10,000 s/mL. $\varDelta T$ was uncalculated that said battery separator had no shutdown capability.

Table 1

Table 2

Table 3

Table 4

INDUSTRIAL IMPLICATION OF THE INVENTION

The porous polyolefin membrane according to the present invention is suited to applications including separators for galvanic cells, separation membranes, building materials such as air permeable waterproofing, or hygiene materials such as air permeable linings for disposable diapers.

LIST OF SYMBOLS

A: Crystalline polyolefin (A)

B: Propylene-α-olefin copolymer (B)

Figure 1:
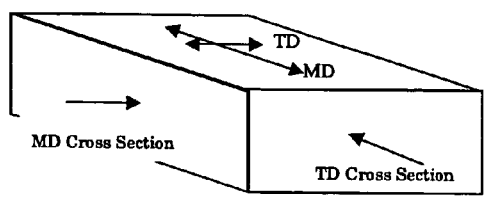
FIG. 1 illustrates sections of the porous polyolefin membrane used for observations according to the invention.
Figure 2:
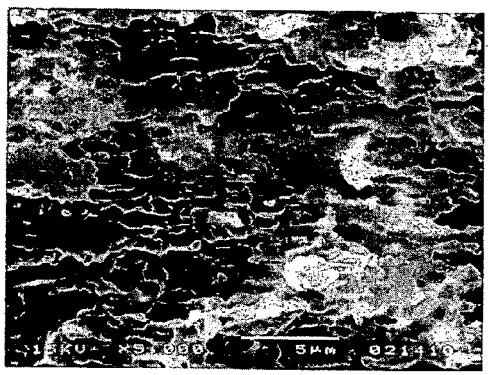
FIG. 2 shows a scanning electron micrograph (×5,000) of a cross section along the MD direction (edge view) of the porous polyolefin membrane obtained in Example 4, FIG. 3 a scanning electron micrograph (×5,000) of a cross section along the TD direction (end view) of the porous polyolefin membrane obtained in Example 4, FIG. 4 a transmission electron micrograph of a cross section along the TD direction (end view) near the polypropylene-α-olefin copolymer region of the porous polyolefin membrane obtained in Example 4.
Figure 3:
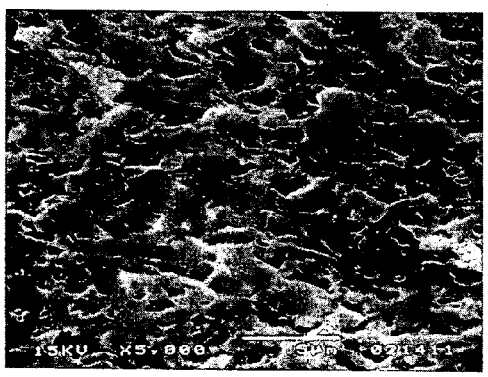
Figure 4:
Figure 5:
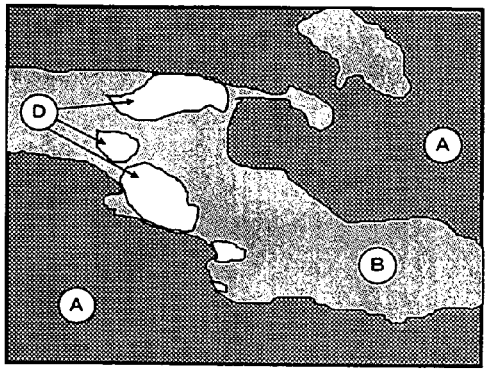
FIG. 5 is a schematic corresponding to FIG. 4.
Figure 6:
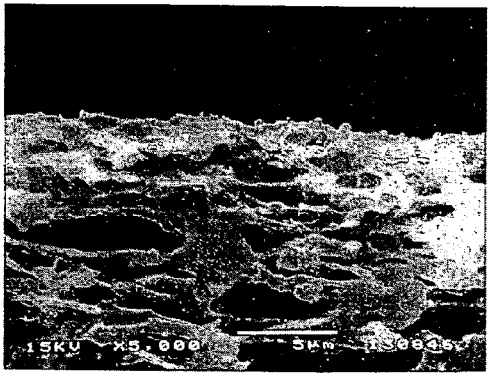
FIG. 6 shows a scanning electron micrograph (×5,000) of a section along the MD direction (edge view) of the porous polyolefin membrane obtained in Example 1 after evaluation of stretching characteristics, and FIG. 7 a scanning electron micrograph (×5,000) of a section along the TD direction (end view) of the porous polyolefin membrane obtained in Example 1 after evaluation of stretching characteristics.
Figure 7:
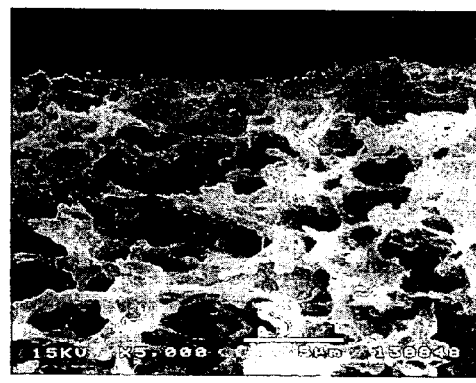

D: Pores formed in the copolymer (B) region

TABLE 1

|  |  | Example 1 | Example 2 | Example 3 | Example 4 | Example 5 | Comparative Example 1 | Comparative Example 2 |
|---|---|---|---|---|---|---|---|---|
| (1) Polyolefin resin (C) | | | | | | | | |
| Crystalline polypropylene (A) content | wt % | 83.5 | 76.9 | 67 | 52 | 80 | 100 | 80 |
| Propylene content in crystalline polypropylene (A) | wt % | 100 | 100 | 100 | 100 | 100 | 100 | 100 |
| Copolymer (B) content | wt % | 16.5 | 23.1 | 33 | 48 | 20 | 0 | 20 |
| Propylene content in copolymer (B) | wt % | 64 | 60 | 60 | 64 | 27 | 0 | 50 |
| $MFR_{WHOLE}$ of polyolefin resin (C) | g/10 min | 2.8 | 3.4 | 0.5 | 0.4 | 5.5 | 2 | 9.4 |
| $MFR_{PP}$ of crystalline polypropylene (A) | g/10 min | 3.2 | 5 | 0.5 | 0.4 | 9.2 | 2 | 22 |
| MFR ratio ($MFR_{PP}/MFR_{RC}$) | | 2 | 5 | 1 | 1 | 13.1 | — | 75 |
| (2) Processing conditions | | | | | | | | |
| [Film forming step] | | | | | | | | |
| Extrusion temperature | ° C. | 280 | 280 | 280 | 280 | 280 | 280 | 280 |
| Lip clearance | mm | 0.2 | 0.2 | 0.2 | 0.2 | 0.2 | 0.2 | 0.2 |
| Linear velocity at the lip | m/min | 3.1 | 3.1 | 3.1 | 3.1 | 3.1 | 3.1 | 3.1 |
| Roller temperature | ° C. | 80 | 80 | 80 | 80 | 80 | 80 | 80 |
| Film forming rate | m/min | 3.7 | 3.7 | 3.7 | 3.7 | 3.7 | 3.7 | 3.7 |
| Draft ratio | | 1.2 | 1.2 | 1.2 | 1.2 | 1.2 | 1.2 | 1.2 |
| Film thickness | μm | 200 | 200 | 200 | 200 | 200 | 200 | 200 |
| [Stretching step] | | | | | | | | |
| Direction of 1st stretching | | TD | TD | TD | TD | TD | TD | TD |
| Transversal stretching ratio | | 3 | 3 | 3 | 3 | 2.5 | 3 | Not stretchable |
| Transversal stretching temperature | ° C. | 23 | 23 | 23 | 23 | 23 | 23 | |
| Longitudinal stretching ratio | | 3 | 3 | 3 | 3 | 3 | 3 | |
| Longitudinal stretching temperature | ° C. | 100 | 100 | 100 | 100 | 100 | 100 | |
| (3) Stretching characteristics of film | | | | | | | | |
| Maximum stretching ratio, longitudinal (MD) | | 3.5 | 4.0 | 5.0 | 6.0 | 2.5 | 4.0 | Not stretchable |
| Maximum stretching ratio, transversal (TD) | | 3.5 | 4.0 | 5.0 | 6.0 | 2.5 | 4.0 | Not stretchable |
| (4) Characteristics of porous membrane | | | | | | | | |
| Thickness | μm | 25 | 27 | 34 | 44 | 30 | 22 | Not stretchable |
| Porosity | % | 12 | 18 | 34 | 50 | 10 | 0 | |
| Maximum pore diameter | μm | 5 | 6 | 5 | 5 | 6 | Not measurable | |
| Moisture permeability | g/m²/24 h | 550 | 700 | 2100 | 3200 | 640 | 10 | |
| Air resistance (Gurley) | s/100 mL | 1500 | 900 | 120 | 30 | 1800 | Not measurable | |

Note:
"Not measurable" means lack of permeability due to absence of continuous pores.

TABLE 2

|  |  | Example 6 | Example 7 | Example 8 | Example 9 | Example 10 | Comparative Example 4 | Comparative Example 5 |
|---|---|---|---|---|---|---|---|---|
| (1) Polyolefin resin (C) | | | | | | | | |
| Crystalline polypropylene (A) content | wt % | 52 | 52 | 52 | 52 | 52 | 52 | 52 |
| Propylene content in crystalline polypropylene (A) | wt % | 100 | 100 | 100 | 100 | 100 | 100 | 100 |
| Copolymer (B) content | wt % | 48 | 48 | 48 | 48 | 48 | 48 | 48 |
| Propylene content in copolymer (B) | wt % | 64 | 64 | 64 | 64 | 64 | 64 | 64 |
| $MFR_{WHOLE}$ of polyolefin resin (C) | g/10 min | 0.4 | 0.4 | 0.4 | 0.4 | 0.4 | 0.4 | 0.4 |
| $MFR_{PP}$ of crystalline polypropylene (A) | g/10 min | 0.4 | 0.4 | 0.4 | 0.4 | 0.4 | 0.4 | 0 |
| MFR ratio ($MFR_{PP}/MFR_{RC}$) | | 1 | 1 | 1 | 1 | 1 | 1 | 1 |
| (2) Processing conditions | | | | | | | | |
| [Film forming step] | | | | | | | | |
| Extrusion temperature | ° C. | 280 | 280 | 280 | 280 | 280 | 280 | 280 |
| Lip clearance | mm | 0.6 | 1.2 | 0.2 | 0.2 | 0.2 | 2 | 0.2 |
| Linear velocity at the lip | m/min | 1.0 | 0.5 | 3.1 | 3.1 | 3.1 | 0.3 | 3.1 |
| Roller temperature | ° C. | 80 | 80 | 80 | 80 | 80 | 80 | 80 |
| Film forming rate | m/min | 3.7 | 3.7 | 3.7 | 3.7 | 3.7 | 3.7 | 3.7 |

TABLE 2-continued

|  |  | Example | | | | | Comparative Example | |
|---|---|---|---|---|---|---|---|---|
|  |  | Example 6 | Example 7 | Example 8 | Example 9 | Example 10 | Comparative Example 4 | Comparative Example 5 |
| Draft ratio |  | 3.6 | 7.2 | 1.2 | 1.2 | 1.2 | 12 | 1.2 |
| Film thickness | μm | 200 | 200 | 200 | 200 | 200 | 200 | 200 |
| [Stretching step] |  |  |  |  |  |  |  |  |
| Direction of 1st stretching |  | TD | TD | TD | TD | TD | TD | TD |
| Transversal stretching ratio |  | 3 | 3 | 5 | 3 | 3 | 3 | 3 |
| Transversal stretching temperature | °C. | 23 | 23 | 23 | 80 | 23 | 23 | 120 |
| Longitudinal stretching ratio |  | 3 | 3 | 6 | 3 | 1 | 3 | 3 |
| Longitudinal stretching temperature | °C. | 100 | 100 | 100 | 100 | — | 100 | 100 |
| (3) Stretching characteristics of film |  |  |  |  |  |  |  |  |
| Maximum stretching ratio, longitudinal (MD) |  | 4.0 | 3.0 | 6.0 | 6.0 | 6.0 | 2.5 | 6.0 |
| Maximum stretching ratio, transversal (TD) |  | 5.0 | 4.0 | 6.0 | 6.0 | 6.0 | 3.0 | 6.0 |
| (4) Characteristics of porous membrane |  |  |  |  |  |  |  |  |
| Thickness | μm | 36 | 28 | 19 | 33 | 93 | 23 | 22 |
| Porosity | % | 38 | 21 | 65 | 32 | 28 | 5 | 0 |
| Maximum pore diameter | μm | 5 | 6 | 7 | 5 | 4 | 4 | — |
| Moisture permeability | g/m$^2$/24 h | 1800 | 640 | 7200 | 2000 | 1500 | 20 | 20 |
| Air resistance (Gurley) | s/100 mL | 300 | 1200 | 8 | 120 | 180 | Not measurable | Not measurable |

TABLE 3

|  |  | Example | | | | |
|---|---|---|---|---|---|---|
|  |  | Example 11 | Example 12 | Example 13 | Example 14 | Example 15 |
| (1) Polyolefin resin (C) |  |  |  |  |  |  |
| Crystalline polypropylene (A) content | wt % | 68 | 58 | 60 | 40 | 40 |
| Propylene content in crystalline polypropylene (A) | wt % | 100 | 100 | 100 | 100 | 100 |
| Copolymer (B) content | wt % | 32 | 42 | 40 | 60 | 60 |
| Propylene content in copolymer (B) | wt % | 60 | 60 | 60 | 60 | 35 |
| MFR$_{WHOLE}$ of polyolefin resin (C) | g/10 min | 11.5 | 14.5 | 11.8 | 4.1 | 4.2 |
| MFR$_{PP}$ of crystalline polypropylene (A) | g/10 min | 50 | 100 | 100 | 100 | 100 |
| MFR ratio (MFR$_{PP}$/MFR$_{RC}$) |  | 99 | 99 | 210 | 205 | 197 |
| (2) Processing conditions |  |  |  |  |  |  |
| [Film forming step] |  |  |  |  |  |  |
| Extrusion temperature | °C. | 280 | 280 | 280 | 280 | 280 |
| Lip clearance | mm | 0.4 | 0.4 | 0.4 | 0.4 | 0.4 |
| Linear velocity at the lip | m/min | 1.5 | 1.5 | 1.5 | 1.5 | 1.5 |
| Roller temperature | °C. | 80 | 80 | 80 | 80 | 80 |
| Film forming rate | m/min | 3.7 | 3.7 | 3.7 | 3.7 | 3.7 |
| Draft ratio |  | 2.4 | 2.4 | 2.4 | 2.4 | 2.4 |
| Film thickness | μm | 200 | 200 | 200 | 200 | 200 |
| [Stretching step] |  |  |  |  |  |  |
| Direction of 1st stretching |  | TD | TD | TD | TD | TD |
| Transversal stretching ratio |  | 2.5 | 3 | 3 | 3 | 2.5 |
| Transversal stretching temperature | °C. | 23 | 23 | 23 | 23 | 23 |
| Longitudinal stretching ratio |  | 3 | 3 | 3 | 3 | 2.5 |
| Longitudinal stretching temperature | °C. | 80 | 80 | 80 | 80 | 80 |
| (3) Stretching characteristics of film |  |  |  |  |  |  |
| Maximum stretching ratio, longitudinal (MD) |  | 2.5 | 3.5 | 3.0 | 3.0 | 2.5 |
| Maximum stretching ratio, transversal (TD) |  | 3.0 | 4.0 | 3.5 | 3.5 | 2.5 |
| (4) Characteristics of porous membrane |  |  |  |  |  |  |
| Thickness | μm | 49 | 40 | 46 | 48 | 59 |
| Porosity | % | 46 | 44 | 52 | 54 | 46 |
| Maximum pore diameter | μm | 10 | 11 | 9 | 8 | 17 |
| Moisture permeability | g/m$^2$/24 h | 500 | 2,800 | 640 | 1,860 | 400 |
| Air resistance (Gurley) | s/100 mL | 2,400 | 640 | 1,170 | 720 | 3,200 |

TABLE 4

|  |  | Example 16 | Example 17 | Example 18 | Example 19 | Comparative Example 6 | Comparative Example 7 |
|---|---|---|---|---|---|---|---|
| (1) Polyolefin resin (C) | | | | | | | |
| Crystalline polypropylene (A) content | wt % | 58 | 58 | 58 | 58 | 58 | 58 |
| Propylene content in crystalline polypropylene (A) | wt % | 100 | 100 | 100 | 100 | 100 | 100 |
| Copolymer (B) content | wt % | 42 | 42 | 42 | 42 | 42 | 42 |
| Propylene content in copolymer (B) | wt % | 60 | 60 | 60 | 60 | 60 | 60 |
| $MFR_{WHOLE}$ of polyolefin resin (C) | g/10 min | 14.5 | 14.5 | 14.5 | 14.5 | 14.5 | 14.5 |
| $MFR_{PP}$ of crystalline polypropylene (A) | g/10 min | 100 | 100 | 100 | 100 | 100 | 100 |
| MFR ratio ($MFR_{PP}/MFR_{RC}$) | | 99 | 99 | 99 | 99 | 99 | 99 |
| (2) Processing conditions | | | | | | | |
| [Film forming step] | | | | | | | |
| Extrusion temperature | ° C. | 280 | 280 | 280 | 280 | 280 | 280 |
| Lip clearance | mm | 0.2 | 1.2 | 0.4 | 0.4 | 2 | 0.4 |
| Linear velocity at the lip | m/min | 3.1 | 0.5 | 1.5 | 1.5 | 0.3 | 1.5 |
| Roller temperature | ° C. | 80 | 80 | 80 | 90 | 80 | 30 |
| Film forming rate | m/min | 3.7 | 3.7 | 3.7 | 3.7 | 3.7 | 3.7 |
| Draft ratio | | 1.2 | 7.2 | 2.4 | 2.4 | 12 | 2.4 |
| Film thickness | μm | 200 | 200 | 200 | 200 | 200 | 200 |
| [Stretching step] | | | | | | | |
| Direction of 1st stretching | | TD | TD | TD | MD | TD | TD |
| Transversal stretching ratio | | 3 | 3 | 3 | 3 | 3 | 2.5 |
| Transversal stretching temperature | ° C. | 23 | 23 | 23 | 80 | 23 | 120 |
| Longitudinal stretching ratio | | 3 | 3 | 1 | 3 | 3 | 2.5 |
| Longitudinal stretching temperature | ° C. | 80 | 80 | 80 | 23 | 80 | 80 |
| (3) Stretching characteristics of film | | | | | | | |
| Maximum stretching ratio, longitudinal (MD) | | 4.0 | 3.0 | 3.0 | 3.0 | 3.0 | 2.0 |
| Maximum stretching ratio, transversal (TD) | | 4.0 | 4.0 | 3.5 | 3.5 | 3.5 | 2.5 |
| (4) Characteristics of porous membrane | | | | | | | |
| Thickness | μm | 44 | 38 | 103 | 38 | 28 | 36 |
| Porosity | % | 50 | 41 | 35 | 42 | 21 | 12 |
| Maximum pore diameter | μm | 11 | 12 | 7 | 11 | — | — |
| Moisture permeability | g/m²/24 h | 3,200 | 820 | 460 | 1,900 | Not measurable | Not measurable |
| Air resistance (Gurley) | s/100 mL | 520 | 2,200 | 4,200 | 920 | Not measurable | Not measurable |

What is claimed is:

1. A porous polyolefin membrane formed by melting and kneading a resin composition containing a polyolefin resin (C) consisting of 30–90 wt % crystalline polypropylene (A) and 10–70 wt % propylene-α-olefin copolymer (B), dispersed in said crystalline polypropylene (A), wherein a ratio of the melt flow rate of said crystalline polypropylene (A) $MFR_{pp}$ to that of said propylene-α-olefin copolymer (B) $MFR_{RC}$ is between 0.1 and 10, to obtain a film-shaped melt, and forming a membrane from said melt at a draft ratio range being from 1 to 10, followed by stretching said membrane at least in one direction, which contains continuous pores in the region consisting of said copolymer (B).

2. A porous polyolefin membrane according to claim 1, wherein a draft ratio range at forming said membrane from said melt is from 1 to 3.

3. A porous polyolefin membrane according to claim 1, wherein the melt flow rate ratio $MFR_{pp}/MFR_{RC}$ is between 0.2 and 5.

4. A porous polyolefin membrane according to claim 1, wherein said resin composition contains a polyolefin resin (C) consisting of 40–70 wt % crystalline polypropylene (A) and 30–60 wt % propylene-α-olefin copolymer (B).

5. A porous polyolefin membrane according to claim 1, wherein said propylene-α-olefin copolymer (B) contains 30–80 wt % of propylene.

6. A porous polyolefin membrane according to claim 1, wherein said propylene-α-olefin copolymer (B) contains 40–70 wt % of propylene.

7. A porous polyolefin membrane according to claim 1, wherein said polyolefin resin (C) is obtained by a multistage polymerization process containing a first step to produce said crystalline polypropylene (A) and an immediately ensuing second step to produce said propylene-α-olefin copolymer (B).

8. A porous polyolefin membrane according to claim 1, wherein the air resistance (Gurley) is between 1 and 2,000 sec/100 mL and the moisture permeability is between 1,000 and 20,000 g/m²·24 h.

9. A porous polyolefin membrane according to claim 1, wherein a temperature at the membrane-break ($T_b$) is equal to or higher than 150° C. and a difference between the membrane-break temperature ($T_b$) and a pore-shutdown temperature ($T_s$) is equal to or less than 20° C.

10. A porous polyolefin membrane formed by melting and kneading a resin composition substantially containing only a polyolefin resin (C) consisting of 30–70 wt % crystalline polypropylene (A) and 30–70 wt % propylene-α-olefin copolymer (B), dispersed in said crystalline polypropylene (A), wherein the ratio of the melt flow rate of said crystalline polypropylene (A) $MFR_{pp}$ to that of said propylene-α-olefin copolymer (B) $MFR_{RC}$ is higher than 10 and equal to or less than 1,000, to obtain a film-shaped melt, and forming a membrane from said melt, followed by stretching said membrane at least in one direction, which contains continuous pores in the region consisting of said copolymer (B).

11. A porous polyolefin membrane according to claim 10, wherein the draft ratio range at forming a membrane from said melt is from 1 to 10.

12. A porous polyolefin membrane according to claim 10, wherein the draft ratio is between 1 and 5.

13. A porous polyolefin membrane according to claim 10, wherein said propylene-α-olefin copolymer (B) contains 30–80 wt % of propylene.

14. A porous polyolefin membrane according to claim 10, wherein said propylene-α-olefin copolymer (B) contains 40–70 wt % of propylene.

15. A porous polyolefin membrane according to claim 10, wherein said polyolefin resin (C) is obtained by a multistage polymerization process containing a first step to produce said crystalline polypropylene (A) and an immediately ensuing second step to produce said propylene-α-olefin copolymer (B).

16. A porous polyolefin membrane according to claim 10, wherein the air resistance (Gurley) is between 10 and 20,000 sec/100 mL and the moisture permeability is between 200 and 10,000 $g/m^2 \cdot 24$ h.

* * * * *